Oct. 28, 1969 G. S. TOBIAS 3,474,600
BONDED CARBON ARTICLE
Filed Sept. 22, 1967 3 Sheets-Sheet 1
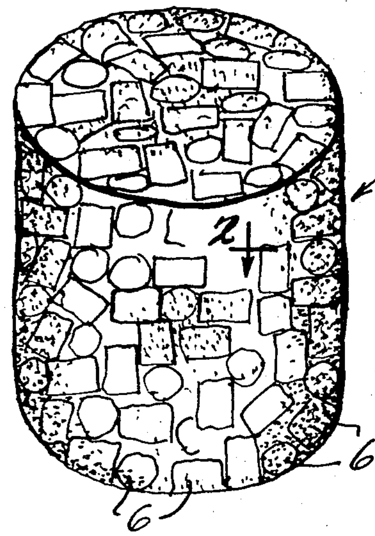
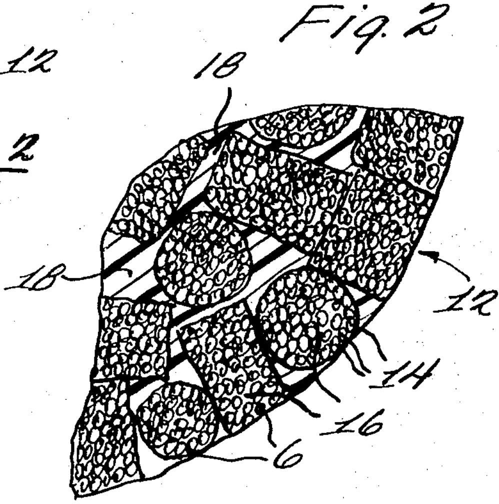
Fig. 3
INVENTOR
GEORGE S. TOBIAS
BY
Cushman, Darby & Cushman
ATTORNEYS

INVENTOR
GEORGE S. TOBIAS

BY
Cushman, Darby & Cushman
ATTORNEYS

INVENTOR

GEORGE S. TOBIAS

BY Cushman, Darby & Cushman

ATTORNEYS

United States Patent Office 3,474,600

Patented Oct. 28, 1969

3,474,600

BONDED CARBON ARTICLE

George S. Tobias, Sewickley, Pa., assignor to Pittsburgh Activated Carbon Company, Pittsburgh, Pa., a corporation of Pennsylvania Filed Sept. 22, 1967, Ser. No. 669,852
Int. Cl. B01d *39/16*
U.S. Cl. 55—524 9 Claims

ABSTRACT OF THE DISCLOSURE

Activated carbon particles are bonded together by monoolefin polymers, preferably polyethylene, to form pellets and the pellets are then bonded to each other by the monoolefin polymer to form larger shapes. The products are characterized by having relatively low pressure drops.

The present invention relates to the preparation of bonded activated carbon.

It has been proposed to prepare cigarette filters by bonding activated carbon with resin binders, e.g. Berger Patent 3,217,715. It is known that bonded carbon can be made using a variety of binders, including thermoplastic and thermosetting resins, to yield a panel which has gas adsorption capacity and pressure drop characteristics similar to that of granular activated carbon packed beds and with a small loss in rate of gas adsorption.

Unfortunately, the pressure drop achieved in such a panel is so high as to preclude or severely limit its use in air purification systems, e.g. industrial and automotive air-conditioning and heating systems, or for use in an evaporative loss control device (ELCD) for removal of hydrocarbon vapors in a motor vehicle.

Accordingly it is an object of the present invention to prepare panels and other shapes of bonded activated carbon having low pressure drops.

Another object is to reduce attrition in activated carbon beds.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be obtained by first bonding activated carbon particles with a thermoplastic monoolefin polymer into pellets and then bonding the pellets together using the same binder to form larger shaped objects having an overall volume of at least 10 times the volume of the original pellets. The volume of the new bonded product can be 100 or even 1,000 times the volume of the pellets.

While it would be expected that there would be a large pressure drop by making such large plugs, surprisingly by bonding the pellets together in the manner indicated using the same thermoplastic monoolefin polymer bonding agent, there is less pressure drop than with individual carbon particles. It is critical to use the specified bonding agents since when other bonding agents are employed, e.g. a bonding agent made from a mixture of 30% pentahydroxyethyl melamine and 70% of a terpolymer of 67 parts ethyl acrylate, 33 parts methyl methacrylate and 5 parts acrylamide to form the initial carbon pellets there is a considerably increased pressure drop in making the rebonded larger shapes than is the case employing polyethylene or the like as the binder.

As the thermoplastic monoolefin polymer binders there can be employed polyethylene, polypropylene, polybutylene, polyamylene, poly 2-methyl amylene, ethylene copolymers with monoolefins having 3 to 10 carbon atoms, e.g. ethylene-propylene copolymer (9:1 or 1:1 or 1:9 on a molar basis for example), ethylene-butylene copolymer (9:1 on a molar basis), ethylene-decene copolymer (95:5 on a weight basis) or copolymers of propylene with higher monoolefins, e.g. propylene-amylene copolymer (9:1 on a weight basis). The term monoolefin copolymer unless otherwise indicated is intended to cover terpolymers and the like, e.g. an ethylene-propylene hexene copolymer (75:20:5 on a weight basis).

Desirably the polyethylene or the like employed as a binder is a powder having a particle size of 50 microns or less, preferably not over 20 microns. If the thermoplastic binder does not have a fine enough particle size there is a tendency for most of it to go to the bottom of the mold with little or no adhesion to the carbon. The activated carbon employed can be from 2 x 4 mesh (U.S. Sieve Series) to 200 mesh or smaller. Preferably the activated carbon has a mesh size between 4 x 10 and 20 x 30 mesh.

The thermoplastic monoolefin is used in an amount of 5 to 25%, preferably 10–15% based on the weight of the activated carbon.

The initial bonding can be carried out in the manner described in Berger Patent 3,217,715 to form pellets having their various dimensions between ¼ and ⅜ inch for example. These pellets which have been described as blackberries have been made in cylindrical rods ¼ x ¼ inch, ⅜ x ⅜ inch, ¼ x ½ inch, ½ x ½ inch and 3 x 3 inches (the first dimension recited being the diameter and the second being the height of the cylinder) and even in rods having a thickness of 3 inches and a diameter of 16 inches. The shape is not critical since the initial blackberries can be spherical, oval or rectangular in shape. The initial blackberries preferably have minimum and maximum diameters between ¼ and ¾ inch but they can have a smaller dimension as low as 0.132 inch.

The initial blackberries are poured into a mold, the mold heated sufficiently to soften the thermoplastic adhesive, preferably while employing a light pressure, e.g. up to 100 p.s.i., on the blackberries. As a result the blackberries or pellets are bonded to one another at the points of contact between the pellets to form a bed, sheet, sphere, cylinder or any other desired shape. The exact pressure is not critical and can be from just sufficient to close the mold to 5000 p.s.i. or more.

The bonded shapes can have minimum dimensions of 2 inches or 10 feet or even 100 feet and the maximum dimension can be 2 inches or more up to 100 feet or higher. As previously indicated the bonded product should have a volume of at least 10 times the volume of the pellets in order to obtain the advantages of the invention including reduced pressure drop and reduced attrition of the activated carbon.

The finished product can be removed from the mold by punching it out while the thermoplastic adhesive is still warm although it can also be done after it has been cooled.

To obtain increased strength of the product without reducing the activity of the carbon the mold can be in the form of metal, e.g. steel, wire, foraminous cage and the thermoplastic adhesive on the outer layers of the carbon melted sufficiently to adhere to the cage and the entire product cooled. Even better adhesion can be obtained if instead of a wire mesh cage there is employed a similar mesh cage made of polyethylene or other monoolefin polymer or other thermoplastic polymer which will adhere to the binder for the activated carbon.

The invention will be understood best in connection with the drawings wherein:

FIGURE 1 is a perspective view of double bonded activated carbon according to the invention;

FIGURE 2 is a fragmentary sectional view along the line 2—2 of FIGURE 1;

FIGURE 3 is a schematic view showing the manner of filling the mold with pellets;

Figure 4:
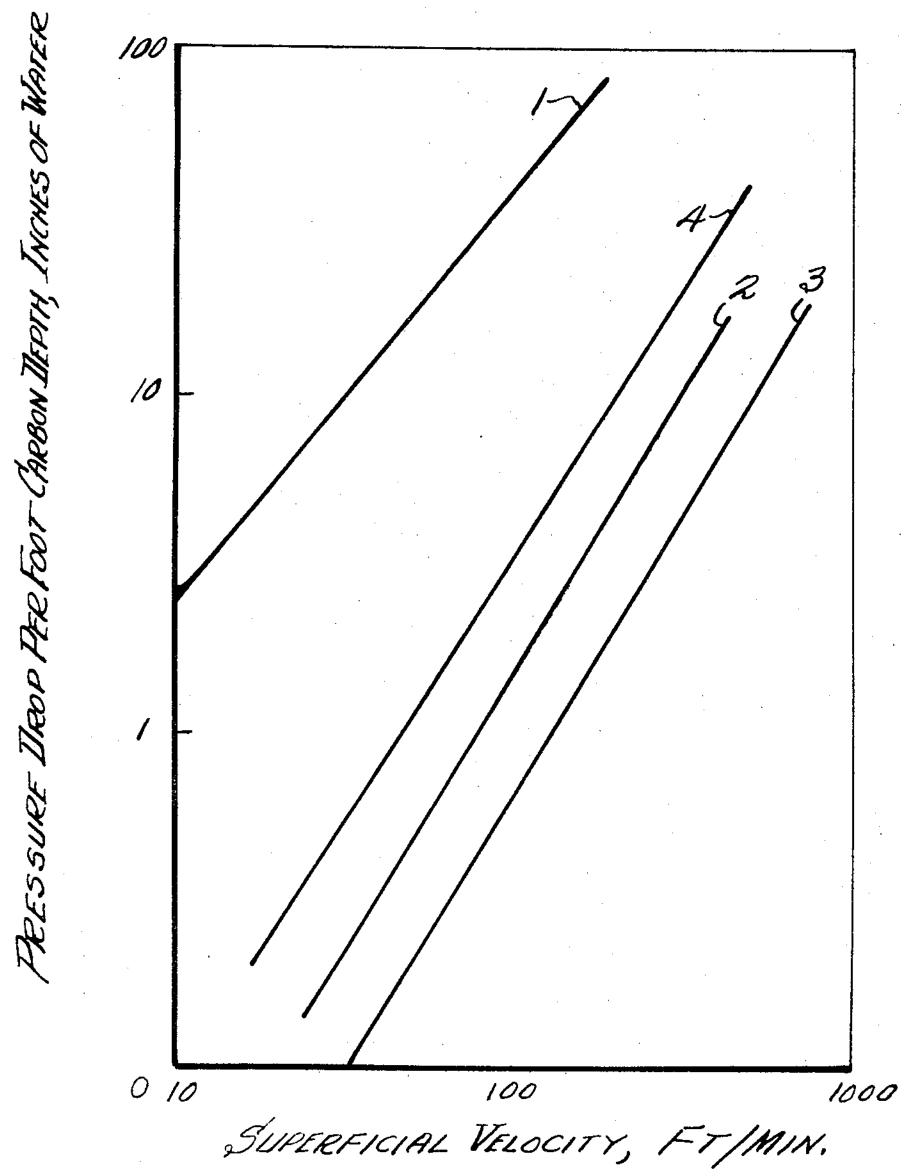
FIGURE 4 is a graph illustrating the pressure drop characteristics of activated carbon in several forms.

Referring more specifically to the drawings as shown in FIGURE 3 there is provided a cylindrical metal cage mold 2 surrounded by heating coil 4.

4 x 10 mesh (U.S. Sieve Series) activated carbon particles were bonded together with 10% of polyethylene (0.914 density) having a particle size of 20 microns to form cylindrical rods or pellets 6 having a diameter of ½ inch and a height of ½ inch. The rods were prepared by heating the mixture of activated carbon and polyethylene at 210° F. using the procedure set forth in Berger Patent 3,217,715, Example 1.

The rods 6 were added to the mold 2 through chute 8. When the mold was full the cover (not shown) was affixed to the mold, a pressure of 100 p.s.i. applied and the heat turned on in coil 4. The heat was continued until the polyethylene binder had softened sufficiently to bind the rods together at the points of contact. Then the cover was removed and the bottom 10 pushed through the mold to remove the newly formed cylinder 12 from the mold. The cylinder thus prepared had a diameter of 3 inches and a height of 6 inches. The product was useful as an air filter and could be employed in air conditioning and heating systems.

As shown in FIGURE 2 the rods, pellets or blackberries 6 are composed of activated carbon particles 14 bonded together by polyethylene 16. The pellets in turn are bonded at their points of contact by polyethylene 18. (The actual amount of polyethylene is greatly exaggerated in FIGURE 2 since it is only 12% of the weight of the carbon.)

Figure 5:
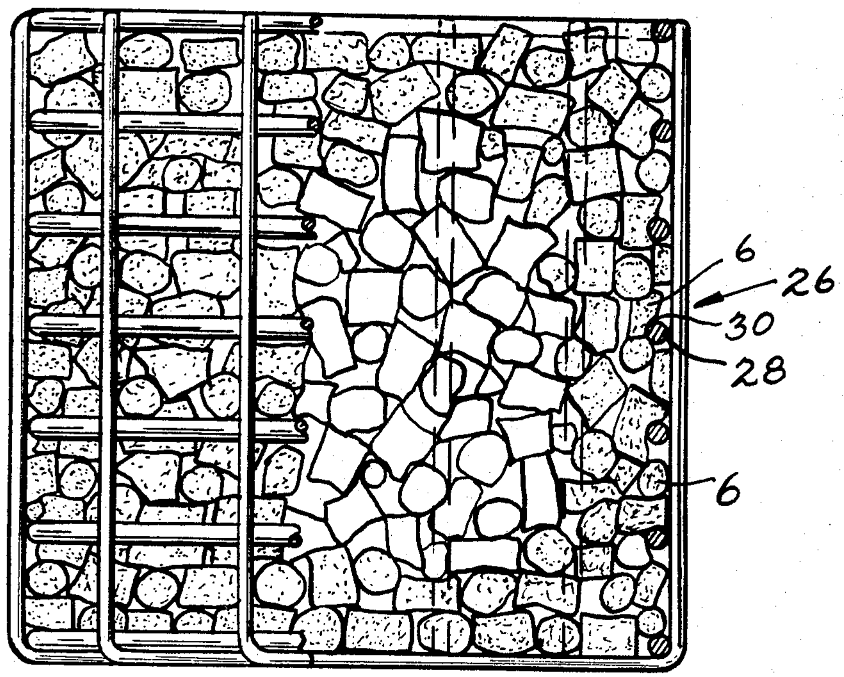
FIGURE 5 is a schematic view showing the bonding of the shaped article to an external foraminous cage.

As shown in FIGURE 5, the pellets 6 bonded together by polyethylene are also bonded to the foraminous metal cage, designated generically at 26, by the polyethylene in the regions of contact 30 of the pellets with the metal rods 28 which form the cage.

FIGURE 4 is a graph showing pressure drop in inches of water per foot of carbon depth as abscissa against superficial velocity in ft./min. using identical cross sectional areas for the various samples. Curve 1 is the curve for unbonded carbon 4 x10 mesh. Curve 2 is the curve for the same activated carbon bonded with polyethylene into ¼ inch pellets which in turn were bonded together according to the present invention to form a sheet. Curve 3 is the curve for the same activated carbon bonded with polyethylene into ¼ inch pellets and curve 4 is the curve for the same activated carbon in which all the particles were individually bonded together with the polyethylene to form the final sheet. The graph was plotted on log paper.

It can be seen from the graph that the bonded pellets of the present invention have a lower pressure drop than for either the unbonded carbon or for carbon which is bonded as individual particles into a sheet. The product of the present invention has the advantage over the loose pellets that no problems of loose particles are encountered in the event the filter has to be cleaned or moved for example and that no separate container is required to confine the pellets.

What is claimed is:

1. Shaped activated carbon particles wherein the activated carbon particles are bonded into pellets by a thermoplastic monoolefin polymer, said pellets having a minimum diameter of 0.132 inch, the polymer being 5 to 25% of the weight of the carbon and the pellets being bonded into a predetermined larger shape by said monoolefin polymer at points of contact between said pellets, said larger shapes having a volume of at least 10 times that of of one of the pellets.

2. Shaped activated carbon according to claim 1 wherein said larger shape has a volume at least 100 times that of one of the pellets.

3. Shaped activated carbon according to claim 2 wherein the polymer is polyethylene.

4. A product according to claim 1 wherein said pellets are cylindrical rods having a minimum diameter of 0.25 inch.

5. A process of preparing the predetermined larger shape of claim 1 comprising heating said pellets sufficiently to soften and render adhesive the thermoplastic polymer bonding the activated carbon particles, and bonding the pellets together at points of contact of polymer between the pellets and thereafter cooling the thus formed larger shape.

6. A process according to claim 5 wherein the larger shape is formed with the aid of pressure.

7. A process according to claim 6 wherein the polymer is polyethylene.

8. A product according to claim 1 wherein the shaped article is also bonded by said polymer to an external foraminous cage.

9. A product according to claim 8 wherein the cage is a metal cage.

References Cited

UNITED STATES PATENTS

| | | | |
|---|---|---|---|
| 2,303,629 | 12/1942 | Gelinas | 210—504 |
| 3,217,715 | 11/1965 | Berger et al. | 55—316 X |

JAMES L. DECESARE, Primary Examiner

U.S. Cl. X.R.

210—485, 496, 506